United States Patent
Thevenin et al.

(10) Patent No.: US 11,656,756 B2
(45) Date of Patent: May 23, 2023

(54) TOUCH DETECTION DEVICE WITH TOUCH INTERFACE MADE OF COMPOSITE MATERIAL

(71) Applicant: SAS WOODOO, Paris (FR)

(72) Inventors: Raphaële Thevenin, Paris (FR); Timothée Boitouzet, Paris (FR)

(73) Assignee: SAS WOODOO, Paris (FR)

( * ) Notice: Subject to any disclaimer, the term of this patent is extended or adjusted under 35 U.S.C. 154(b) by 0 days.

(21) Appl. No.: 17/824,222

(22) Filed: May 25, 2022

(65) Prior Publication Data
US 2022/0283685 A1  Sep. 8, 2022

Related U.S. Application Data

(63) Continuation of application No. 16/944,706, filed on Jul. 31, 2020, which is a continuation of application No. PCT/FR2019/050262, filed on Feb. 6, 2019.

(30) Foreign Application Priority Data

Feb. 9, 2018 (FR) ...................... 1851089

(51) Int. Cl.
*G06F 3/0488* (2022.01)
*G06F 3/041* (2006.01)

(52) U.S. Cl.
CPC .......... *G06F 3/0488* (2013.01); *G06F 3/0412* (2013.01); *G06F 2203/04103* (2013.01)

(58) Field of Classification Search
CPC ................ G06F 3/0488; G06F 3/0412; G06F 2203/04103
See application file for complete search history.

(56) References Cited

U.S. PATENT DOCUMENTS

| | | |
|---|---|---|
| 3,607,355 A | 9/1971 | Loeb et al. |
| 3,750,303 A | 8/1973 | Gates et al. |
| 3,968,276 A | 7/1976 | Allen |
| 4,178,861 A | 12/1979 | Vandernoek et al. |
| 4,239,906 A | 12/1980 | Antrim et al. |

(Continued)

FOREIGN PATENT DOCUMENTS

| | | |
|---|---|---|
| CA | 1095663 A | 2/1981 |
| CA | 1186855 A | 5/1985 |

(Continued)

OTHER PUBLICATIONS

Berglund L. et al.; "Lignin-Retaining Transparent Wood", ChemSusChem, 2017, No. 10, pp. 3445-3451.

(Continued)

*Primary Examiner* — Sejoon Ahn
(74) *Attorney, Agent, or Firm* — Wilson Sonsini Goodrich & Rosati

(57) ABSTRACT

A touch detection device comprises a touch interface (1) made of composite material comprising a lignocellulosic material and a resin, the lignocellulosic material being impregnated with the resin, the fraction of resin being between 30% and 80% by weight relative to the total weight of composite material. The resin impregnated makes it possible to render the touch interface stable irrespective of the temperature and moisture conditions with a view to use both outside and inside. Use of the touch detection device for a touchscreen.

20 Claims, 1 Drawing Sheet

(56) References Cited

U.S. PATENT DOCUMENTS

| | | |
|---|---|---|
| 4,348,256 A | 9/1982 | Bergstrom et al. |
| 4,956,048 A | 9/1990 | Hise |
| 4,992,308 A | 2/1991 | Sunol |
| 5,041,192 A | 8/1991 | Sunol et al. |
| 5,169,687 A | 12/1992 | Sunol |
| 6,242,245 B1 | 6/2001 | Amann et al. |
| 6,649,245 B2 | 11/2003 | Lenderink |
| 6,670,077 B1 | 12/2003 | Huang |
| 6,770,168 B1 | 8/2004 | Stigsson |
| 6,830,784 B2 | 12/2004 | Gutowski et al. |
| 7,959,765 B2 | 6/2011 | Argyropoulos |
| 8,546,109 B2 | 10/2013 | Varanasi et al. |
| 8,575,374 B1 | 11/2013 | DeLong et al. |
| 8,772,406 B2 | 7/2014 | Linhardt et al. |
| 8,986,501 B2 | 3/2015 | Li et al. |
| 9,343,733 B2 | 5/2016 | Lee et al. |
| 10,030,157 B2 | 7/2018 | Humiston et al. |
| 10,538,012 B2 | 1/2020 | Boitouzet et al. |
| 11,254,026 B2 | 2/2022 | Boitouzet et al. |
| 2002/0096274 A1 | 7/2002 | Lindstrom et al. |
| 2002/0142145 A1 | 10/2002 | Lenderink |
| 2002/0154100 A1 | 10/2002 | Hatakeda et al. |
| 2004/0090426 A1 | 5/2004 | Bourdelais et al. |
| 2005/0110722 A1 | 5/2005 | Hayafuji |
| 2005/0163935 A1 | 7/2005 | Magne et al. |
| 2005/0233069 A1 | 10/2005 | Mikami et al. |
| 2006/0262258 A1 | 11/2006 | Wang et al. |
| 2008/0020222 A1 | 1/2008 | Hiraku et al. |
| 2008/0160288 A1 | 7/2008 | Kingma et al. |
| 2008/0223629 A1 | 9/2008 | Kashikawa et al. |
| 2009/0176052 A1 | 7/2009 | Childs et al. |
| 2009/0294186 A1 | 12/2009 | Fontanella et al. |
| 2010/0081798 A1 | 4/2010 | Balensiefer et al. |
| 2010/0156842 A1 | 6/2010 | Cherif |
| 2011/0115723 A1 | 5/2011 | Wang et al. |
| 2011/0220307 A1 | 9/2011 | Duggirala et al. |
| 2011/0254778 A1 | 10/2011 | Wang et al. |
| 2012/0105370 A1 | 5/2012 | Moore |
| 2012/0146922 A1 | 6/2012 | Kang et al. |
| 2012/0268693 A1 | 10/2012 | Takeda et al. |
| 2013/0063684 A1 | 3/2013 | Chen et al. |
| 2013/0167603 A1 | 7/2013 | Bathurst et al. |
| 2014/0139560 A1 | 5/2014 | Jung et al. |
| 2014/0186592 A1 | 7/2014 | Jeon et al. |
| 2014/0269411 A1 | 9/2014 | Pelland et al. |
| 2014/0311201 A1 | 10/2014 | Bathurst |
| 2014/0311984 A1 | 10/2014 | Nakama et al. |
| 2015/0035794 A1 | 2/2015 | Zhitomirskiy |
| 2016/0010279 A1 | 1/2016 | Hu et al. |
| 2016/0041646 A1 | 2/2016 | Cho et al. |
| 2016/0187544 A1 | 6/2016 | Watanabe et al. |
| 2016/0209551 A1 | 7/2016 | Bekku et al. |
| 2016/0297970 A1 | 10/2016 | Garoff et al. |
| 2017/0107641 A1* | 4/2017 | Busardo ............ C23C 14/0015 |
| 2018/0157111 A1* | 6/2018 | Ueki ................ G02F 1/133602 |
| 2018/0162891 A1 | 6/2018 | Miettinen |
| 2018/0188870 A1* | 7/2018 | Boggs ................ G02F 1/13338 |
| 2018/0201765 A1 | 7/2018 | Sun et al. |
| 2018/0208804 A1 | 7/2018 | Mieda et al. |
| 2018/0318773 A1 | 11/2018 | Childs et al. |
| 2018/0327612 A1 | 11/2018 | Humiston et al. |
| 2018/0342702 A1 | 11/2018 | Hu et al. |
| 2019/0012032 A1* | 1/2019 | Brandao Salgado ........................ B32B 17/10036 |
| 2019/0113791 A1 | 4/2019 | Yamamoto et al. |
| 2019/0121474 A1 | 4/2019 | Lee et al. |
| 2019/0121481 A1 | 4/2019 | Schoenauer et al. |
| 2020/0164542 A1 | 5/2020 | Boitouzet |
| 2020/0223091 A1 | 7/2020 | Hu et al. |
| 2020/0238565 A1 | 7/2020 | Hu et al. |
| 2020/0363721 A1* | 11/2020 | Aritoshi .................. G06F 3/044 |
| 2021/0019033 A1 | 1/2021 | Thevenin et al. |
| 2021/0240588 A1* | 8/2021 | Balthazar De Lima Mussauer .... G06F 3/0488 |
| 2021/0316471 A1 | 10/2021 | Thevenin et al. |
| 2022/0134596 A1 | 5/2022 | Boitouzet et al. |

FOREIGN PATENT DOCUMENTS

| | | |
|---|---|---|
| CN | 1429695 A | 7/2003 |
| CN | 1813900 A | 8/2006 |
| CN | 1872508 A | 12/2006 |
| CN | 1911612 A | 2/2007 |
| CN | 1985891 A | 6/2007 |
| CN | 101279458 A | 10/2008 |
| CN | 101476252 A | 7/2009 |
| CN | 101649125 A | 2/2010 |
| CN | 102152356 A | 8/2011 |
| CN | 102660885 A | 9/2012 |
| CN | 102704297 A | 10/2012 |
| CN | 102785274 A | 11/2012 |
| CN | 102864672 A | 1/2013 |
| CN | 202882247 U | 4/2013 |
| CN | 103370469 A | 10/2013 |
| CN | 103993042 A | 8/2014 |
| CN | 104275723 A | 1/2015 |
| CN | 104389216 A | 3/2015 |
| CN | 104448585 A | 3/2015 |
| CN | 104651964 A | 5/2015 |
| CN | 106243391 A | 12/2016 |
| DE | 19714302 A1 | 10/1998 |
| EP | 1312453 A2 | 5/2003 |
| EP | 2295215 A1 | 3/2011 |
| EP | 2669382 A1 | 12/2013 |
| EP | 3047656 A1 | 7/2016 |
| EP | 2850109 B1 | 8/2017 |
| EP | 2935604 B1 | 11/2018 |
| EP | 3656520 A1 | 5/2020 |
| FR | 2507639 A1 | 12/1982 |
| FR | 2672296 A1 | 8/1992 |
| JP | S60242003 A | 12/1985 |
| JP | S6162574 A | 3/1986 |
| JP | H02160986 A | 6/1990 |
| JP | H05138615 A | 6/1993 |
| JP | 2010042604 A | 2/2010 |
| JP | 2010163497 A | 7/2010 |
| JP | 2011225847 A | 11/2011 |
| JP | 2012009233 A | 1/2012 |
| JP | 2012093667 A | 5/2012 |
| JP | 2015020307 A | 2/2015 |
| JP | 2015077740 A | 4/2015 |
| JP | 2017504235 A | 2/2017 |
| JP | 2017207906 A | 11/2017 |
| JP | 6244808 B2 | 12/2017 |
| KR | 100977721 B1 | 8/2010 |
| RU | 2309039 C2 | 10/2007 |
| RU | 2007144304 A | 6/2009 |
| SU | 1657225 A1 | 6/1991 |
| WO | WO-9002612 A1 | 3/1990 |
| WO | WO-9002836 A1 | 3/1990 |
| WO | WO-2010089604 A1 | 8/2010 |
| WO | WO-2011112703 A2 | 9/2011 |
| WO | WO-2012080702 A2 | 6/2012 |
| WO | WO-2013005104 A2 | 1/2013 |
| WO | WO-2013066196 A1 | 5/2013 |
| WO | WO-2013181481 A1 | 12/2013 |
| WO | WO-2014002674 A1 | 1/2014 |
| WO | WO-2014113884 A1 | 7/2014 |
| WO | WO-2015084520 A1 | 6/2015 |
| WO | WO-2016138901 A1 | 9/2016 |
| WO | WO-2017029120 A1 | 2/2017 |
| WO | WO-2017098149 A1 | 6/2017 |
| WO | WO-2017136714 A1 | 8/2017 |
| WO | WO-2018013501 A1 | 1/2018 |
| WO | WO-2018068583 A1 | 4/2018 |
| WO | WO-2017098149 A9 | 5/2018 |
| WO | WO-2018120560 A1 | 7/2018 |
| WO | WO-2018130776 A1 | 7/2018 |
| WO | WO-2018182497 A1 | 10/2018 |
| WO | WO-2018191181 A1 | 10/2018 |
| WO | WO-2018211945 A1 | 11/2018 |

(56) References Cited

FOREIGN PATENT DOCUMENTS

| | | |
|---|---|---|
| WO | WO-2018224598 A1 | 12/2018 |
| WO | WO-2019155159 A1 | 8/2019 |
| WO | WO-2020058629 A1 | 3/2020 |

OTHER PUBLICATIONS

Berglund L. et al.; "Optically Transparent Wood from a Nanoporous Cellulosic Template: Combining Functional and Structural Performance", Biomacromolecules, 2016, No. 17, pp. 1358-1364.

Berglund L. et al.; "Transparent Wood for Functional and Structural Applications", Royal Society Publishing, Downloaded on Dec. 27, 2017, pp. 1-15.

Birkel, J. The surface impregnation of wood: II. use characteristics of impregnated wood: III. investigations of resin adhesives. (1946). Electronic Theses and Dissertations. Paper 1872.

Chen, H. Lignocellulosic Material. From: Handbook of Thermoset Plastics (Third Edition), 2014.

Engineering ToolBox, (2008). Refractive Index common Liquids, Solids and Gases, [online] Available at: https://www.engineeringtoolbox.com/refractive-index-d_1264.html.

Fink, S. Transparent Wood—A New Approach in the Functional Study of Wood Structure. Holzforschung. vol. 46 (1992) No. 5 pp. 403-408. DOI:10.1515/hfsg.1992.46.5.403.

Ganeshram, et al. Synthesis and characterization of phenol formaldehyde resin as a binder used for coated abrasives. Indian Journal of Science and Technologie, vol. 6 (6S), Jun. 2013, p. 4816.

Grinins, et al. Investigation of Birch Wood Impregnation with Phenol-Formaldehyde (PF) Resins. Sep. 2018;Conference: 9th European Conference on Wood Modification, At Arnhem, The Netherlands.

Hexion. Hot topic: Evolving fire performance requirements can be met through the use of phenolic resins. Composite Materials. Railway Interiors International. Annual Showcase 2019. pp 74-75. Retrieved online at https://www.hexion.com/docs/default-source/psr/evolving-fire-performance-requirements-can-be-met-through-the-use-of-phenolic-resins.pdf?sfvrsn=aae6b95e_4.

Hu, L. et al.; Highly Anisotripic, Highly Transparent Wood Composites. Adv Mater. Jul. 2016;28(26):5181-7. doi: 10.1002/adma.201600427. Epub May 4, 2016.

Hu, L. et al.; "Novel Nanostructured Paper with Ultrahigh Transparency and Ultrahigh Haze for Solar Cells", Nano Letters, 2014, 14, pp. 765-773.

Hu, L. et al.; "Wood Composite as an Energy Efficient Building Material: Guided. Sunlight Transmittance and Effective Thermal Insulation", 2016, Adv. Energy Mater., 6, 1601122, pp. 1-7.

Li, et al. Lignin-Retaining Transparent Wood. ChemSusChem. Sep. 11, 2017; 10(17): 3445-3451.

Liew, et al. Direct Cellulase Gene Amplification From Hot Spring Using the Guidance of 16S rRNA Amplicon Metagenomics. In Metagenomics, 2018.

Luce, Foster. Delignified Impregnated Wood. Research Engineer, Westcraft, Inc., Los Angeles, California. Oct. 1944: 654-657.

Mathews, et al. Bacterial biodegradation and bioconversion of industrial lignocellulosic streams. Appl Microbiol Biotechnol. Apr. 2015;99(7):2939-2954. doi: 10.1007/s00253-015-6471-y. Epub Feb. 27, 2015.

Mi, et al. Scalable aesthetic transparent wood for energy efficient buildings. Nature communications 11.1 (2020): 1-9.

Nogi, M. et al.; "Optically Transparent Nanofiber Paper", Advanced Material, 2009, 21, pp. 1595-1598.

Norman et al; "A new method for the determination of cellulose, based upon observations on the removal of lignin and other encrusting materials", Biochem J. 1933; 27(3): 818-831.

NPTEL. Preparation of wood pulp by sulfate (kraft) process. Accessed online Feb. 15, 2013 at https://nptel.ac.in/courses/103103029/pdf/rnod4.pdf.

PCT/EP2018/065047 International Search Report with Written Opinion dated Aug. 21, 2018.

PCT/FR2016/053247 International Search Report with Written Opinion dated Mar. 7, 2017.

PCT/FR2019/050262 International Search Report with Written Opinion dated May 23, 2019.

PCT/FR2019/052177 International Search Report with Written Opinion dated Jan. 16, 2020.

Ritter, George J.; "Distribution of Lignin in Wood" Microscopical Study of Changes in Wood Structure Upon Subjection to Standard Methods of Isolating Cellulose and Lignin, Industrial and Engineering Chemistry, Nov. 1925, vol. 17, No. 11, pp. 1194-1197.

Roger M. Rowell, et al, Handbook of Wood Chemistry and Wood Composites, 2012.

Song, et al. Processing bulk natural wood into a high-performance structural material. Nature. Feb. 8, 2018; vol. 554, pp. 224+.

Swedish Standards Institute. SS-EN 13183-1. Moisture content of a piece of sawn timber—Part 1: Determination by oven dry method. Apr. 11, 2003 (This document contains the official English version of the European Standard EN 13183-1:2002).

Tanaka, et al. Solute diffusion into cell walls in solution-impregnated wood under conditioning process I: effect of relative humidity on solute diffusivity. J Wood Sci. (61):543-551 (2015). https://doi.org/10.1007/s10086-015-1503-x.

The Dow Chemical Company. Ethanolamines: Monoethanolamine Diethanolamine Triethanolamine. Published Jan. 2003. 21 pages. Retrieved online at http://www.resikem.com.ar/images/dow-ethanolamines.pdf.

ToolBox—Refractive Index for some common Liquids, Solids and GasesSome common fluids and their refractive index Available at https://www.engineeringtoolbox.com/refractive-index-d_1264.html. Accessed on April of 2021.

Torres, D. Why knock on wood when touch will do? MSP Low-Power Plays—Blogs—TI E2E Community. May 25, 2017. Availabe at https://e2e.ti.com/blogs_/b/process/archive/2017/05/25/why-knock-on-wood-when-touch-will-do. Retrieved Oct. 1, 2020.

U.S. Appl. No. 15/781,978 Notice of Allowance dated Oct. 14, 2021.
U.S. Appl. No. 15/781,978 Office Action dated Jul. 6, 2020.
U.S. Appl. No. 15/781,978 Office Action dated May 14, 2021.
U.S. Appl. No. 15/781,978 Office Action dated Nov. 16, 2020.
U.S. Appl. No. 16/185,342 Notice of Allowance dated Sep. 4, 2019.
U.S. Appl. No. 16/185,342 Office Action dated Mar. 22, 2019.
U.S. Appl. No. 16/700,123 Office Action dated Apr. 23, 2021.
U.S. Appl. No. 16/700,123 Office Action dated Aug. 23, 2022.
U.S. Appl. No. 16/700,123 Office Action dated Oct. 5, 2021.
U.S. Appl. No. 16/944,706 Notice of Allowance dated Aug. 5, 2022.
U.S. Appl. No. 16/944,706 Notice of Allowance dated Jun. 16, 2022.
U.S. Appl. No. 16/944,706 Notice of Allowance dated May 18, 2022.
U.S. Appl. No. 16/944,706 Notice of Allowance dated Sep. 7, 2022.
U.S. Appl. No. 16/944,706 Office Action dated Apr. 1, 2021.
U.S. Appl. No. 16/944,706 Office Action dated Dec. 30, 2021.
U.S. Appl. No. 17/576,799 Office Action dated Jun. 8, 2022.
U.S. Appl. No. 17/576,799 Office Action dated Sep. 21, 2022.
U.S. Appl. No. 15/781,978 Office Action dated Feb. 13, 2020.
U.S. Appl. No. 15/781,978 Office Action dated Sep. 24, 2019.

Zhu, et al. Anisotropic, Transparent Films with Aligned Cellulose Nanofibers. Adv Mater. Jun. 2017;29(21).

Zhu, et al. Highly Anisotropic, Highly Transparent Wood Composites. Adv Mater. Jul. 2016;28(26):5181-7.

Zhu, L. et al; "Transparent and Hazewood Composites for Highly Efficient Broadband Light Management in Solar Cells", 2016. Nano Energy, 26, pp. 332-339.

\* cited by examiner

TOUCH DETECTION DEVICE WITH TOUCH INTERFACE MADE OF COMPOSITE MATERIAL

CROSS-REFERENCE

This application is a Continuation Application of U.S. application Ser. No. 16/944,706, filed Jul. 31, 2020, which is a continuation of PCT Application No. PCT/FR2019/050262, filed Feb. 6, 2019, which claims priority to French Patent Application No. 1851089, filed Feb. 9, 2018, each of which is entirely incorporated herein by reference.

The present invention concerns a touch detection device comprising a touch interface, a touch screen comprising the touch detection device and a display device, as well as an automotive vehicle comprising the touch detection device.

Generally, the present invention concerns the field of touch detection devices.

The present invention finds its application for example particularly, non-limitatively, in the field of luxury goods, electronic equipment (mobile telephones, tablets, hi-fi, televisions, drones), clocks and watches, furniture, and more particularly in the field of automotive vehicles to equip the cabin. In the cabin, a touch detection device can make it possible to produce areas for controls at the location of the dashboard, the vehicle doors, the steering wheel or the central console between the front seats of an automotive vehicle. These control areas comprise surfaces referred to as "smart surfaces".

STATE OF THE ART

A known solution is a touch detection device with a touch interface of natural wood described, in particular in patent application WO 2016/138901.

However, the use of natural wood as a touch interface has numerous drawbacks.

In particular wood is sensitive to variations in temperature and humidity. The air present in the cavities of the wood may become charged with moisture and modify the electrical conductivity of the wood and the cellulose may become charged with moisture and modify the dimensional characteristics of the wood. Thus, wood can only be used in a limited number of environments.

As a matter of fact, wood deteriorates when it is used in a humid environment and/or when the variations in temperature are great. Wood is also sensitive to attack by insects and to the proliferation of fungi. The dielectric properties of wood are also perturbed by moisture. Thus, a touch interface of wood may only be used indoors or in an environment protected from variations in temperature and humidity.

The present invention is directed to providing a touch detection device with a touch interface less sensitive to variations in temperature and humidity for use both indoors and outdoors.

To that end, the present invention concerns, according to a first aspect, a touch detection device comprising a touch interface of composite material comprising a resin and a lignocellulosic material, the lignocellulosic material being impregnated with the resin, the resin fraction being comprised between 30% and 80% by mass of the total mass of composite material.

Such a solution has numerous advantages and in particular makes it possible to render a touch interface of lignocellulosic material less sensitive to variations in temperature and humidity thanks to the impregnation of a resin into the lignocellulosic material.

In particular, the resin replaces the air present in the lignocellulosic material at least in part. In other words, the resin fills the cavities present in the lignocellulosic material. This is referred to as impregnation to the heart of the lignocellulosic material. The resin makes it possible to improve the stability of the dielectric properties of the touch interface. Thus, the touch interface may be suitable for use equally well outdoors as indoors.

In an advantageous embodiment, said touch interface has a light transmission coefficient of at least 5%.

The light transmission coefficient expresses the amount of light passing through a body that allows light to pass. In other words, the light transmission coefficient expresses the translucent or even transparent character of the touch interface. Here, the light transmission coefficient of at least 5% means that the touch interface is at least translucent. Thus, the user sees through the touch interface and can interact with commands displayed under the touch detection device.

In another advantageous embodiment, the resin has a refractive index substantially equal to that of the lignocellulosic material.

When the refractive indexes of the resin and of the lignocellulosic material are close, that is to say identical or practically identical, light passes through the touch interface while being deviated little or not at all. In other words, the touch interface comprising the resin and the lignocellulosic material is all the more translucent, or even transparent, the closer the refractive indices.

Furthermore, when the refractive indexes of the resin and of the lignocellulosic material are close, light passes through the touch interface while being diffused little or not at all.

The phenomenon commonly designated by the term "transmission haze" is reduced.

In other words, the touch interface comprising resin and lignocellulosic material makes it possible to avoid attenuation of the light intensity on passage of the light through the touch interface.

Advantageously, the refractive index of the resin may be selected in a range comprised between 1.35 and 1.70.

In an advantageous embodiment, said lignocellulosic material is wood comprising lignin and a network of cellulose and hemicellulose.

In other words, the lignocellulosic material can be wood in which the network of cellulose and hemicellulose is preserved, even after treatment, and in which a higher or lower proportion of lignin is preserved.

The wood has a specific appearance and particular mechanical properties. Thus, the touch interface can keep the mechanical properties of the wood as well as its specific appearance.

By way of example, the lignocellulosic material of the touch interface is delignified wood. The fraction of removed lignin is comprised between 40% and 90% by weight of the lignin present in the wood.

A touch interface having variable mechanical, conductivity and translucency properties can be obtained by varying in particular the fraction of removed lignin. According to the selected application, precedence may be given to properties of flexibility, conductivity and translucency for the touch interface.

In practice, the lignocellulosic material is a longitudinal cut or a transverse cut from a log.

According to the selected cut, the properties of conductivity and the visual appearance of the touch interface can be defined.

In another advantageous embodiment, the resin is hydrophobic.

The hydrophobic resin interacts little or not at all with water. In other words, the resin absorbs little water. Thus, the composite material forming the touch interface is more stable in relation to moisture while maintaining its mechanical and dielectric properties.

In another advantageous embodiment, the touch interface has a thickness comprised between 0.4 mm and 30 mm.

The specific thickness of the touch interface makes it possible to provide a touch interface having specific mechanical characteristics. Thus, the touch interface can have higher or lower flexibility and/or have higher or lower mechanical strength.

In another advantageous embodiment, the resin comprises electrically conducting particles.

For a given thickness of touch interface, the electrically conducting particles added to the resin make it possible to increase the conductivity of the touch interface. Thus, it is possible to increase the thickness of the touch interface while preserving properties of touch detection.

According to a second aspect, the invention concerns a touch screen. The touch screen comprises a display device and a touch detection device, the touch interface having a light transmission coefficient at least equal to 5%.

According to a third aspect, the invention concerns an automotive vehicle. The automotive vehicle comprises a touch detection device and/or a touch screen according to the invention.

BRIEF DESCRIPTION OF THE DRAWINGS

Still other particularities and advantages of the invention will appear in the following description.

In the accompanying drawings, given by way of non-limiting example:

FIG. 1a represents a diagrammatic view in perspective of a touch interface of a touch detection device.

Figure 1A:
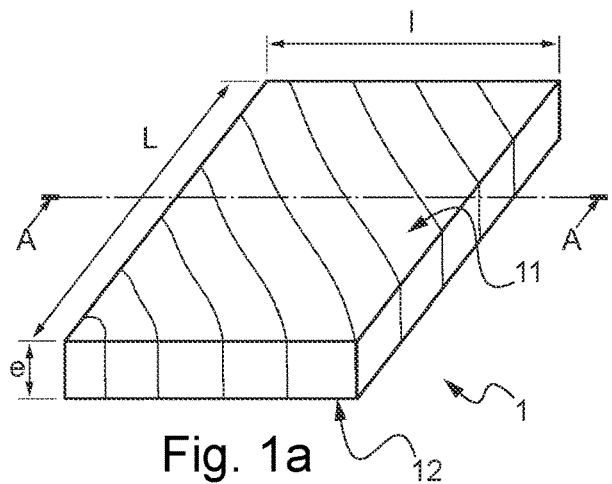
FIG. 1a is a diagrammatic view in perspective of a touch interface of a touch detection device in accordance with one embodiment of the invention.

Here, the touch interface 1 has the shape of a hexahedron. However, the touch interface may have other particular shapes, such as a shape with a triangle, a circle, a square or a polygon as base. Here, the touch interface 1 typically has three dimensions: a length L, a width I and a thickness e.

In one advantageous embodiment, the thickness e is the smallest dimension. The thickness e is comprised between 0.4 mm and 30 mm.

For a thickness e comprised between 0.4 mm and 2 mm, the touch interface 1 may be flexible or be made flexible. For a thickness e comprised between 2 mm and 30 mm, the touch interface 1 has greater rigidity.

Thus, a specific thickness e gives the touch interface 1 specific mechanical properties.

In general, the touch interface 1 is formed from a composite material. The composite material is a lignocellulosic material impregnated with a resin.

A method of impregnating a composite material is known to the person skilled in the art and is in particular described in document WO 2017/098149. The method described in the cited document principally consists in a step of delignification, called soaking, followed by a step of impregnation called filling with a filling compound.

Of course, other modes of impregnation may be used to form the composite material.

The resin fraction is comprised between 30% (minimum resin fraction) and 80% (maximum resin fraction) by mass relative to the total mass of composite material.

Two examples of resin fraction calculation are presented below. The first example concerns non-delignified wood. The second example concerns wood that is wholly or partly delignified. Numerical applications illustrate these calculations.

According to a first example, for non-delignified wood, the resin fraction by mass, denoted f(resin) is literally expressed:

$$f(\text{resin}) = \frac{m(\text{resin})}{m(\text{wood} + \text{resin})}$$

denoting:

m(resin): mass of resin impregnated m(wood+resin): mass of wood and resin (composite material)

In other words, by explicitly defining the mass of resin impregnated in the wood and the mass of wood and resin, the resin fraction by mass is literally expressed:

$$\frac{f(\text{resin, }vol) \times V(\text{wood}) \times \mu(\text{resin})}{V(\text{wood}) \times \mu(\text{wood}) + f(\text{resin, }vol) \times V(\text{wood}) \times \mu(\text{resin})} \quad (1)$$

denoting:

f(resin, vol): volume fraction of air in the wood (or volume fraction of resin filling all the empty spaces naturally present in the wood)

V(wood): volume of the wood $\mu$(wood): mass per unit volume of the wood $\mu$(resin): mass per unit volume of resin Or for example, by simplifying equation (1) by V(wood), the resin fraction by mass is expressed:

$$\frac{f(\text{resin, }vol) \times \mu(\text{resin})}{\mu(\text{wood}) + f(\text{resin, }vol) \times \mu(\text{resin})}$$

By way of non-limiting example, the resin fraction by mass may be calculated for non-delignified hardwood (with a level of relative humidity of 15%) of density equal to 0.7 (equivalent to 30% air by volume). Here, the hardwood is impregnated for example with a methyl polymethacrylate resin (PMMA) having a mass per unit volume of 1.18 g/m$^3$.

The resin fraction by mass is:

$$f(\text{hardwood, }PMMA) = \frac{30\% \times 1.18 \times 10^{\wedge}3}{0.7 \times 10^{\wedge}3 + 30\% \times L18 \times 10^{\wedge}3}$$

i.e.:

$f(\text{hardwood, }PMMA) = 0.34$

Thus, a maximum of 34% resin by mass can impregnate this non-delignified hardwood (at a level of relative humidity of 15%) of density equal to 0.7 when all the spaces naturally present in the lignocellulosic structure of the wood are replaced by resin.

According to a second example, the wood here is wholly or partly delignified.

In this example, the empty spaces naturally present in the lignocellulosic structure of the wood and the empty spaces obtained by partial or total delignification of the wood are filled with resin.

The resin fraction by mass is then expressed:

$$\frac{[f(\text{delignified}) \times f(\text{wood lignin})) + f(\text{air})] \times \mu(\text{resin}) \times V(\text{wood})}{\mu(\text{wood}) \times V(\text{wood}) + [f(\text{delignified}) \times f(\text{wood lignin})) + f(\text{air})] \times \mu(\text{resin}) \times V(\text{wood})}$$

denoting:

f(delignified): degree of delignification
f(wood lignin): volume fraction of lignin in the wood
f(air): volume fraction of air in the wood
V(wood): volume of wood
μ(wood): mass per unit volume of the wood
μ(resin): mass per unit volume of resin Thus, by way of non-limiting application, the resin fraction by mass may be calculated for softwood of density equal to 0.5 (at a level of relative humidity of 15%), of lignin volume fraction of 30%, with a degree of delignification of 90%, and impregnated with PMMA of mass per unit volume of 1.18 g/m³.

The resin fraction by mass is expressed:

$$f(\text{softwood, PMMA}) = \frac{[90\% \times 30\% + 50\%] \times 1.18 \times 10^{\wedge}3}{0.5 \times 10^{\wedge}3 + [90\% \times 30\% + 50\%] \times L18 \times 10^{\wedge}3}$$

i.e.:

$$f(\text{softwood, PMMA}) = 0.64$$

Thus, the maximum fraction of resin by mass in this example is 64%.

These example embodiments are in no way limiting.

Thus, the fraction by mass of resin impregnated into the composite material depends in particular on the nature of the wood (softwood, exotic, hardwood), and thus the density or mass per unit volume of the wood, on the partial or total delignification of the wood and on the type of resin impregnated into the wood.

The resin is typically a thermosetting polymer or a thermoplastic polymer, such as described in document WO 2017/098149 of which the content is incorporated in the present description by reference. The resin may also be an elastomer.

Advantageously, the resin is a polymer or a copolymer, or a monomer associated with a radical polymerization initiator in the case of a thermoplastic, or a cross-linking agent in the case of a thermoset.

The thermoplastic polymers or copolymers may be selected from among the following families: the family of fluoropolymers, polystyrenes, polycarbonates or polyamides, or any other family known to the person skilled in the art.

The thermoplastic monomers may be selected from petro-sourced monomers of the methacrylate type (ethyl, methyl, butyl), or biosourced monomers, associated with initiators of the azoisobutyronitrile type, peroxides, or any initiator known to the person skilled in the art.

Advantageously, the thermosetting monomers are to be selected from Epoxy or phenolic petro-sourced monomers, or any other resin known to the person skilled in the art, or biosourced monomers, associated with suitable cross-linking agents.

Resin has the advantage of making stable the composite material, which is formed from a lignocellulosic material, whatever the conditions of temperature and humidity. Thus, the touch interface may be suitable equally for use indoors and outdoors.

The resin may be hydrophobic. Thus, the composite material reacts even less with the moisture in the environment.

Thus, the touch interface has more stable dielectric characteristics.

In an advantageous embodiment, said lignocellulosic material is wood comprising lignin and a network the network being composed of cellulose and hemicellulose.

Thus, the touch interface 1 has at the same time a look close to natural wood and mechanical characteristics at least similar to those procured by wood.

More specifically, still with reference to document WO 2017/098149, comparative measurements of bending, axial traction and axial compression of a sample of fir wood treated according to the method of impregnating the composite material cited in the document and of a sample of natural fir wood were carried out.

The bending measurements show that the sample of treated fir wood has a bending force increased by 200% and more progressive breaking than the sample of natural fir wood. The axial compression measurements show that the sample of treated fir wood has a resistance to a compression force increased by 170% and more progressive breaking than the sample of natural fir wood. The axial traction measurements show that the sample of treated fir wood has plastic deformation with a value substantially identical to that of the sample of natural fir wood.

Thus, in an advantageous embodiment, the lignocellulosic material obtained by the method described in document WO 2017/098149, makes it possible to obtain mechanical characteristics superior or at least equivalent to those of an untreated lignocellulosic material of wood type.

Furthermore, in an advantageous embodiment, the wood is selected from specific species. As a matter of fact, according to the species selected, the wood has a particular appearance and mechanical characteristics. Thus, the touch interface 1 also has a particular appearance and mechanical characteristics.

Figure 2:
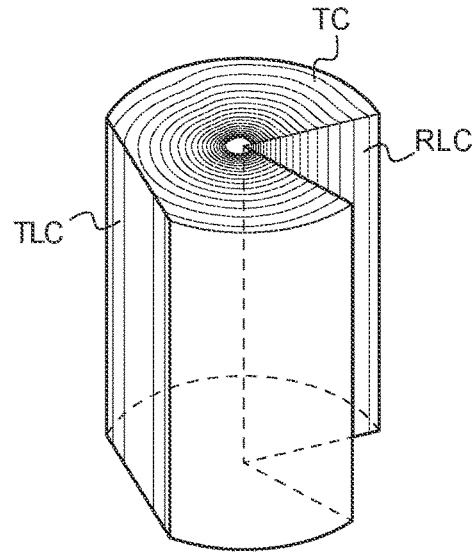
FIG. 2 is a perspective view of the log comprising several cross-section planes.

Referring to FIG. 2, it is to be noted that a log 2 may be cut along different planes.

When the log 2 us cut perpendicularly to the direction formed by the log 2, this is referred to as a transverse cut TC.

When the log 2 us cut in a direction parallel to the direction formed by the log 2, this is referred to as a longitudinal cut. There are two types of longitudinal cut: the radial longitudinal cut RLC and the tangential longitudinal cut TLC.

A radial longitudinal cut RLC which passes by the central longitudinal axis ZZ' of the log is distinguished from a tangential longitudinal cut TLC which does not pass by the central longitudinal axis ZZ' of the log.

In an advantageous embodiment the lignocellulosic material used to produce the composite material of the touch interface comes from a longitudinal cut or from a transverse cut of a log.

Thus, the lignocellulosic material is wood with mechanical properties that are basically homogeneous.

In an advantageous embodiment, the thickness of the lignocellulosic material can correspond to cut values that are standard in the wood industry in Europe, for example 0.6 mm, 0.9 mm, 1.2 mm, 2.5 mm, 6 mm, 18 mm or 27 mm.

The touch interface 1 is formed from such a wood cut, of standard thickness for example. However, the thickness e of the touch interface may be slightly different from that of the lignocellulosic material used, further to its impregnation by a resin.

Figure 1B:
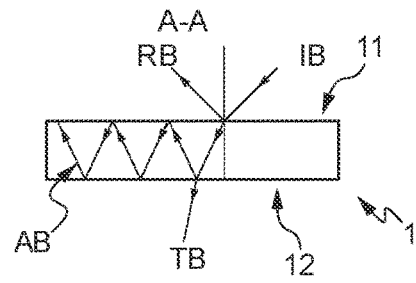
FIG. 1b is a diagrammatic view of the touch interface represented in FIG. 1a on the cross-section plane A-A.

FIG. 1*b* shows a diagrammatic view of the touch interface 1 upon which impinges a beam of light. The touch interface 1 is chosen here to be suitable for allowing at least a certain percentage of the incident light to pass. Thus, when an incident beam of light IB enters into contact with an upper face 11 of the touch interface 1, the light beam is deviated. A refracted light beam RB and an absorbed light beam AB are formed. When the absorbed light beam AB reaches the lower face 12 of the touch interface 1, a transmitted light beam TB is formed. The absorbed light beam AB can again be refracted on the lower face 12 of the touch interface 1.

The light transmission coefficient corresponds to the quantity of light passing through the touch interface, that is to say the traversing light beam TB. More specifically, the measurement is made by comparison between the value of the ambient lighting and the value of the light transmission flux. The measurements are made in lux.

It is considered that a body is translucent when the light transmission coefficient is comprised between 5% and 90%. It is considered that a body is transparent when the light transmission coefficient is greater than 90%. It will be noted that these values are averages.

For example, in the case of a touch interface 1 obtained from delignified wood, it is possible for the light transmission coefficient not to be the same in all directions. As a matter of fact, according to the areas of the touch interface 1, the wood is delignified to a greater or lesser extent and allows the light to pass better or less well.

For the measurement protocol of the light transmission coefficient, reference is to be made, for example, to the document WO 2017/098149.

Furthermore, still with reference to document WO 2017/098149, according to the lignocellulosic material selected, the touch interface 1 may have a very variable optical rendition.

As a matter of fact, when the lignocellulosic material is wood, the network of cellulose and hemicellulose is characteristic of each species. Thus, the touch interface 1 comprising lignocellulosic material may be translucent to a greater or lesser extent, or even transparent, with different grain geometries and tints.

For example, still in the case of wood type lignocellulosic material, according to the species, the zones of summer wood and spring wood may not have the same nature or not be differentiated. The same applies for the sapwood and the heartwood for certain species.

In the case of a transverse cut, it is thus possible, for certain woods, in particular those having annual growth rings (alternation of summer wood and spring wood), that one of the parts, often the summer wood, is less prompt to undergo the treatment, for example the soaking step, thus leaving apparent, after treatment, zones of higher or lower translucency or transparency, or even that are opaque.

It is also possible for the reactivity of the structure during the filling step to be substantially uniform making the material uniformly translucent or transparent.

In other words, in the case of a lignocellulosic material of wood type, the selection of the species influences the optical characteristics of the lignocellulosic material.

Thus, a pertinent selection of the species and of the cut makes it possible to optimize the translucent or transparent character of the touch interface 1.

In an advantageous embodiment, the resin is selected to obtain a touch interface 1 having a light transmission coefficient of at least 5%.

A light transmission coefficient of at least 5% enables the user to see through the touch interface 1.

In another advantageous embodiment, the resin is selected with refractive index substantially identical to that of the lignocellulosic material to impregnate. The resin may be selected with a refractive index comprised between 1.35 and 1.70.

In other words, the resin is selected such that it has the same optical density as that of the cellulose.

As a matter of fact, lignocellulosic material is mainly composed of cellulose and hemicellulose has an optical density close to that of cellulose. Thus, to obtain a lignocellulosic material that is translucent, or possibly even transparent, the resin will be selected with the same optical density as that of cellulose.

More specifically, still with reference to the document WO 2017/098149, the refractive index of the polymer so obtained is typically comprised in a range from 1.35 to 1.70 and is often taken around 1.47, 1.53, 1.56 or 1.59, which a possible variation around these values of the order of 10%.

It may also be, in a different embodiment, typically comprised within a range of from 1.40 to 1.60, for example approximately 1.47.

Thus, a pertinent selection of the resin makes it possible to optimize the translucent or transparent character of the touch interface 1.

Furthermore, a pertinent selection of the wood species, of the wood cut and of the resin makes it possible to limit the diffraction and the refraction of the rays incident on the touch interface 1, such that the contours of the transmitted light signal are sharp.

By comparison, untreated neutral wood diffuses the light. More specifically, a light halo forms on passage of the light within the thickness of the wood. Thus, proper reading through its thickness is rendered difficult.

The translucent or transparent property enables use of the touch interface 1 as man-machine interface without requiring engraving. Thus, the touch interface 1, presented here, may be used in the manufacture of a comfort night display (known as a "black panel") in the automotive sector. As a matter of fact, as the touch interface 1 is translucent or transparent, it is not necessary to engrave the surface of the touch interface 1 to indicate the different possible commands.

The commands are for example displayed on a display device 5, described below in the description.

In an advantageous embodiment, the touch interface 1 is in contact by its lower face 12 with a filter having controlled opacity (not shown).

More specifically, the filter having controlled opacity is connected to the electrical supply means enabling its opacity to be controlled.

When the filter having controlled opacity is electrically de-energized, it is opaque. The light cannot pass through. When the filter having controlled opacity is electrically energized, it is transparent or translucent. Light can pass through the filter, and thus be transmitted through the touch interface 1.

In another embodiment, the resin is mixed with electrically conducting particles in order in particular to improve the conductive properties of the touch interface 1.

In other words, for a same thickness, a touch interface 1 comprising a doped resin has appreciably reduced electrical resistivity properties relative to a touch interface 1 comprising a non-doped resin.

Thus, a touch interface 1 comprising a doped resin can have a greater thickness while keeping conductivity properties configured for touch detection.

Typically, the electrically conducting particles are of indium tin oxide, indium oxide or particles of graphite.

Of course, other electrically conducting particles may be mixed with the resin.

In other words, the resin is doped with electrically conducting particles and is impregnated into the structure of the lignocellulosic material.

In the case of a wood type lignocellulosic material having porosity, the doped resin inserts into the cavities of the wood.

Thus, the touch interface 1 has better electrical conductivity performance.

In another embodiment, the touch interface 1 does not comprise doped resin but is in contact by its lower face 12 with a touch film having piezoelectric or capacitive properties.

The user thus keeps the feel of the wood on the upper face 11 of the touch interface 1. The association of a touch film with the touch interface 1 improves the touch detection properties of the assembly so constituted.

Figure 3:
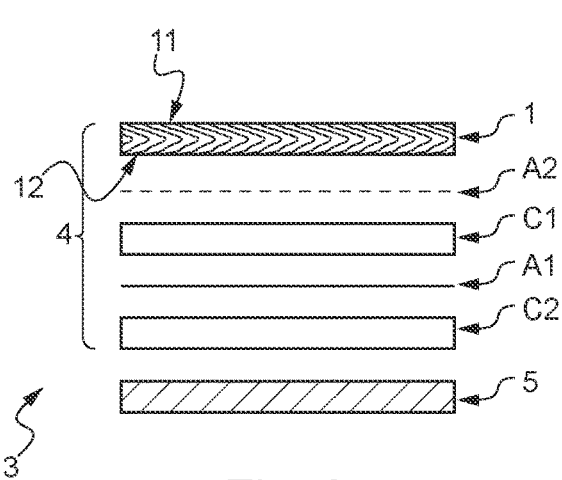
FIG. 3 is an exploded diagrammatic view illustrating the components of an example touch screen according to one embodiment of the invention.

With reference to FIG. 3, there is shown a diagrammatic view of a touch screen 3, according to one embodiment of the invention.

The touch detection technology represented is of capacitance technology type. However, any other touch detection technology may be used. As a matter of fact, resistive technology, surface wave technology, infra-red technology or for instance piezoelectric technology may be used with the touch interface 1.

These different types of technology and their means of implementation are well known to the person skilled in the art and do not need to be set out here.

The touch screen 3 comprises a touch detection device 4, a lower face of the touch detection device 4 being in contact with a display device 5.

For example, the display device 5 is a Foled (standing for "Flexible Oled").

This type of display device 5 is well-adapted to cooperate with a touch interface 1 as described above, in particular when the touch interface 1 has flexibility properties.

The display device 5 may generally be a flexible, semi-rigid or rigid screen.

The display device 5 may be a display device of Oled type, LCD type, OTFT type, OLCD type or QLED type.

It may be a fixed-image display device, of OLED type, which may be turned on or off according to the touch command.

In this case, between the display device 5 and the touch interface 1, there is preferably inserted a conducting transparent layer cut up to delimit active zones of the touch screen, as well as an insulating layer between that conducting layer and the touch interface 1 in order to avoid the touch interface 1 creating dielectric bridges above the active zones of the display device 5.

The display device 5 may also be a screen for animated images (animated graphics object), such as a mobile telephone display.

In another embodiment, the display device 5 is formed from an image projection system comprising an image projector (not shown). Here, the touch interface 1 is in contact by its lower face 12 with a touch film making it possible to activate the image projector. The projection of the images is carried out on the lower face 12 of the touch interface 1.

The specific disposition of the touch film under the touch interface 1 makes it possible to maintain the direct feel of the touch interface 1 by the user. In other words, the user's finger is in contact with the grain of the wood of the touch interface 1, and not the touch film.

In another advantageous embodiment, the display device is a luminous textile, that is to say a textile to which has been added an electroluminescent component. This luminous textile may be bonded against the touch detection device 4.

In a particular embodiment, the luminous textile can cover all or part of the lower face of the touch detection device 4.

Here too, the specific disposition of the luminous textile enables direct contact with the wood of the touch interface 1.

The touch detection device 4 comprises a touch interface 1, as described above. The touch interface 1 in this embodiment is in contact by its lower face 12 with a first conducting layer A1. The first conducting layer C1 is in contact by its lower face with an adhesive layer A1. The adhesive layer A1 is in contact by its lower face with a second conducting layer C2. The second conducting layer C2 is complementary to the first conducting layer C1.

The four layers 1, C1, A1, C2 are stacked and placed on the display device 5.

In an alternative embodiment, an additional adhesive layer A2 is placed between the lower face 12 of the touch interface 1 and the upper face of the first conducting layer C1. The additional adhesive layer A2 makes it possible to hold the touch interface 1 to the rest of the touch detection device 4. Other means for fastening the touch interface 1, such as a support frame, may be employed.

It will be noted that the display device 5 comprises lighting means making it possible to display different elements on the touch screen 3.

Thus, in another advantageous embodiment, even when the touch interface 1 has a low light transmission coefficient, for example between 5% and 30%, its is possible for the user to see the elements displayed on the touch screen 3 and to interact with those elements.

In an advantageous embodiment, a diffusing layer (not shown) is disposed in contact with the lower face 12 of the touch interface 1.

In other words, the diffusing layer is not disposed on the upper face 11 of the touch interface 1. Thus, the user does not touch the diffusing layer but the wood of the touch interface 1.

The diffusing layer is able to diffuse the light coming from the lighting means of the display device 5.

In general terms, the touch interface 1, described above, may be used in any touch detection device 4 and touch screen 3 well-known to the person skilled in the art.

In an advantageous embodiment, the touch detection device 4 is associated with a system of optical sensors and micro-controllers (not shown) configured to modulate the color of the light emitted by the display device 5 according to the light perturbations of the ambient lighting and according to the color of the touch interface 1 to obtain light at the output of the touch interface 1 that is substantially close to the light emitted directly as output from the display device.

For example, when the species of wood employed for the touch interface 1 is yellow or orange, the system of optical sensors and micro-controllers will give the order to the lighting means of the display device 5 to emit blue light, and conversely. Light is thus obtained that is visible to the user, close to the light emitted directly at the output of the display device 5 independently of the species of wood used.

For example again, when the ambient lighting is weak, the system of optical sensors and micro-controllers will give the order to the lighting means of the display device 5 to emit light that is more intense.

Generally, the system of sensors and micro-controllers is directed to modulating the color and intensity of the light according to the light perturbations of the ambient lighting and according to the color of the species of wood such that on output from the touch interface 1 the light is substantially identical (intensity, colorimetric spectrum, etc.) to the light output from the display device 5.

In an advantageous embodiment, the touch detection device 4 comprises a haptic device enabling haptic feedback by vibration.

In other words, when the user touches the touch detection device 4, force in return is provided. This force in return may be produced by virtue of electro-vibration emitters or ultrasonic vibration emitters.

Figure 4:
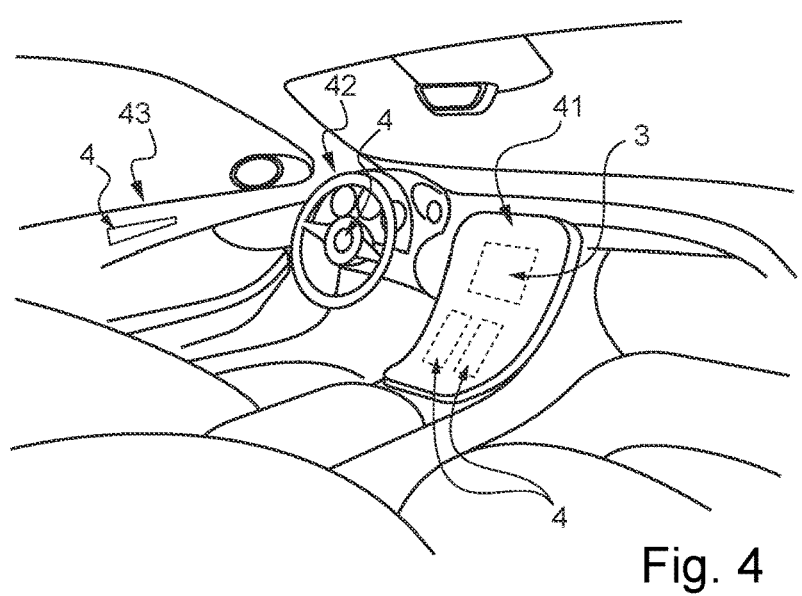
FIG. 4 is a diagrammatic representation of an example of an automotive vehicle cabin according to one embodiment of the invention.

With reference to FIG. 4, examples of use of such a touch detection device 4 and touch screen 3 are represented in a cabin of an automotive vehicle.

In one embodiment, a touch detection device 4 and/or a touch screen 3 is integrated into the central console 41 between the front seats of an automotive vehicle. Similarly, a touch detection device 4 and/or a touch screen 3 is integrated at the location of the steering wheel 42 or at the location of one of the doors 43 of the automotive vehicle.

Thus, the user of the vehicle, driver or passenger, can interact with the commands of the vehicle by virtue of a multimedia set integrated into the central console 41.

In the example embodiment presented in FIG. 4, the multimedia set integrated into the central console 41 comprises two touch detection devices 4 and a touch screen 3.

In an advantageous embodiment, the multimedia set comprises only one or more touch screens 3. The multimedia set comprises a uniform face without visible demarcation for the user when the lighting means of the touch screen are not operating.

In other words, the touch screen 3 is not visible for the user when the lighting means are not operating.

Still with reference to the embodiment shown in FIG. 4, each touch detection device 4 comprises touch parts and non-touch parts.

More specifically, for a touch detection device 4, the touch parts correspond to the parts of the touch interface 1 in contact with a touch detection technology. They are, for example, touch-control keys. The non-touch parts are parts of the touch interface 1 of which the lower face 12 is not in contact with a touch detection technology. They are, for example, spaces between the touch-control keys.

Of course, the invention is not limited to the example embodiments described above. The present invention may be used for a great variety of implementations for luxury goods (such as watch bracelets), shape-forming (or design) members or for mass-market electronic items (such as telephones, digital tablets, televisions).

The present invention can also be used for elements linked to mobility such as motor vehicle interior elements (dashboards, door elements), in the nautical field (such as jet skis, boats, yacht or jet interior elements) or in the aeronautical field (such as drones).

The present invention can also be used for sports elements (such as skis), elements of mass consumption goods (such as spectacles or telephone protections) and elements for the field of construction.

The present invention can also be used in the field of furniture or office automation, such as a desk table with a touch screen or a door with touch detection devices making it possible to interact with the user.

The invention claimed is:

1. A device comprising a touch interface configured to receive input from a user, wherein said touch interface comprises a lignocellulosic material, wherein said lignocellulosic material comprises lignin and a preserved network of cellulose and hemicellulose present in an organic material; and at least one filling compound, wherein said at least one filling compound is impregnated into said lignocellulosic material such that said at least one filling compound fills at least a portion of said lignocellulosic material comprising the preserved network of cellulose and hemicellulose present in the organic material.

2. The device of claim 1, wherein said touch interface has a light transmission coefficient of greater than 0%.

3. The device of claim 1, wherein said filling compound comprises a resin.

4. The device of claim 3, wherein said resin has a refractive index substantially equal to that of said lignocellulosic material.

5. The device of claim 4, wherein said refractive index is at least about 1.35 and at most about 1.70.

6. The device of claim 3, wherein said resin comprises electrically conducting particles.

7. The device of claim 1, wherein said lignocellulosic material comprises from about 10% to about 60% by weight of said lignin.

8. The device of claim 1, wherein said touch interface further comprises a filter.

9. The device of claim 8, wherein said filter is configured to control an opacity of said touch interface, wherein said opacity is electrically adjustable.

10. The device of claim 1, wherein said touch interface further comprises a touch film.

11. The device of claim 1, further comprising a display device configured to display information to said user.

12. The device of claim 1, wherein said at least one filling compound is from about 30% to about 80% by mass of a total mass of said touch interface.

13. The device of claim 1, wherein said touch interface has a light transmission coefficient of greater than 0% and less than 90%.

14. The device of claim 1, wherein the touch interface has a light transmission coefficient of at least 5%.

15. The device of claim 3, wherein the resin is hydrophobic.

16. The device of claim 3, wherein the resin is comprises electrically conductive particles.

17. The device of claim 1, wherein an outer surface of the touch interface comprises a grain of the lignocellulosic material, and is configured such that the user will touch the grain of the lignocellulosic material when inputting information into the device.

18. The device of claim 1, wherein touch interface is in contact with a first conducting layer, wherein the first conducting layer is in contact with an adhesive layer, wherein the adhesive layer is in contact with a second conducting layer, and wherein the first conducting layer is complementary to the second conducting layer.

19. A method, comprising:
   a. providing a lignocellulosic material comprising lignin and a network of cellulose and hemicellulose; and
   b. processing said lignocellulosic material of (a) wherein said processing comprises contacting said lignocellulosic material with at least one filling compound to fill at least a portion of said lignocellulosic material, thereby providing a touch interface configured to receive input from a user.

20. The method of claim 19, wherein said at least one filling compound is from about 30% to about 80% by mass of a total mass of said touch interface.

* * * * *